US010708170B2

(12) United States Patent
Sen et al.

(10) Patent No.: US 10,708,170 B2
(45) Date of Patent: Jul. 7, 2020

(54) TRANSFERRING DATA OVER MULTIPLE NETWORK PATHS USING DECOUPLED SUB-FLOWS

(71) Applicant: AT&T Intellectual Porperty I, L.P., Atlanta, GA (US)

(72) Inventors: Subhabrata Sen, Westfield, NJ (US); Zhuoqing Morley Mao, Ann Arbor, MI (US); Feng Qian, Bloomington, IN (US); Yihua Guo, Mountain View, CA (US)

(73) Assignees: AT&T Intellectual Property I, L.P., Atlanta, GA (US); The Trustees of Indiana University, Indianapolis, IN (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/921,238

(22) Filed: Mar. 14, 2018

(65) Prior Publication Data
US 2019/0288935 A1   Sep. 19, 2019

(51) Int. Cl.
*H04L 12/721* (2013.01)
*H04L 12/707* (2013.01)
(Continued)

(52) U.S. Cl.
CPC .............. *H04L 45/14* (2013.01); *H04L 45/24* (2013.01); *H04L 45/44* (2013.01); *H04W 84/12* (2013.01)

(58) Field of Classification Search
CPC ......... H04L 45/14; H04L 45/24; H04L 45/44; H04W 84/12
(Continued)

(56) References Cited

U.S. PATENT DOCUMENTS 7,636,309 B2   12/2009   Alicherry et al.
7,672,273 B2   3/2010   Ho et al.
(Continued)

FOREIGN PATENT DOCUMENTS

IN          18/2014         2/2014
KR    20150123185 A       11/2015
(Continued)

OTHER PUBLICATIONS

"Testing the performance of Multipath TCP for connections with limited bandwidth", Aalborg University Electronics and IT (Year: 2016).*
(Continued)

*Primary Examiner* — Yemane Mesfin
*Assistant Examiner* — Intekhaab A Siddiquee

(57) ABSTRACT

A request for a chunk of data is received from an application executing on a remote device. The chunk of data is split into a plurality of packets including a first packet and a second packet. A first sub-flow is selected to transport the first packet to the remote device and a second sub-flow is selected to transport the second packet. The first sub-flow is decoupled from the second sub-flow. A first stop time is selected for the first sub-flow and a second stop time is selected for the second sub-flow. The first stop time determines when the first sub-flow will complete at the remote device and the second stop time determines when the second sub-flow will complete at the remote device. The first stop time and the second stop time are selected so that the first sub-flow and the second sub-flow will complete simultaneously at the remote device.

20 Claims, 4 Drawing Sheets

(51) Int. Cl.
*H04W 84/12* (2009.01)
*H04W 28/02* (2009.01)
*H04L 12/805* (2013.01)
*H04L 12/803* (2013.01)
*H04L 12/841* (2013.01)

(58) Field of Classification Search
USPC .......................................................... 370/235
See application file for complete search history.

(56) References Cited

U.S. PATENT DOCUMENTS

| | | | |
|---|---|---|---|
| 8,780,693 | B2 | 7/2014 | Kim et al. |
| 8,817,797 | B2 | 8/2014 | Hampel |
| 9,246,643 | B2 | 1/2016 | Braun et al. |
| 9,336,042 | B1 | 5/2016 | Brenneman et al. |
| 9,456,464 | B2 | 9/2016 | Biswas et al. |
| 9,537,759 | B2 | 1/2017 | Calmon et al. |
| 9,571,230 | B2 | 2/2017 | Volvovski et al. |
| 9,609,631 | B2 | 3/2017 | Kuo |
| 9,742,659 | B2 | 8/2017 | Sundarababu et al. |
| 9,888,042 | B2 | 2/2018 | Annamalaisami et al. |
| 2005/0286487 | A1 | 12/2005 | Chitrapu |
| 2014/0293951 | A1* | 10/2014 | Sun ................... H04W 56/001 370/329 |
| 2017/0063699 | A1 | 3/2017 | Kim |
| 2017/0187497 | A1 | 6/2017 | Walid et al. |
| 2017/0188407 | A1 | 6/2017 | Zee et al. |
| 2018/0254979 | A1* | 9/2018 | Scahill ................... H04L 45/24 |

FOREIGN PATENT DOCUMENTS

| | | |
|---|---|---|
| WO | 03071440 A1 | 8/2003 |
| WO | 2015155132 A1 | 10/2015 |
| WO | 2016007050 A1 | 1/2016 |
| WO | 2017117259 A1 | 7/2017 |
| WO | 2017157457 A1 | 9/2017 |

OTHER PUBLICATIONS

Dulman, Stefan, et al. "Trade-off between traffic overhead and reliability in multipath routing for wireless sensor networks." Wireless Communications and Networking, WCNC 2003, vol. 3, IEEE, 2003. http://www.ub.utwente.nl/webdocs/ctit/1/000000bd.pdf.

Apostolopoulos, John, et al., "On multiple description streaming with content delivery networks." INFOCOM 2002. Twenty-First Annual Joint Conference of the IEEE Computer and Communications Societies, Proceedings, vol. 3, IEEE, 2002.

Argyriou, Antonios, and Vijay Madisetti. "Using a new protocol to enhance path reliability and realize load balancing in mobile ad hoc networks." Ad Hoc Networks 4.1 (2006): 60-74. http://citeseerx.ist.psu.edu/viewdoc/download?doi=10.1.1.304.9259&rep=rep1&type=pdf.

Du, Pengyuan, et al. "Multipath TCP in SDN-enabled LEO satellite networks." Military Communications Conference, MILCOM 2016-2016, IEEE, 2016. http://nrlweb.cs.ucla.edu/nrlweb/publications/download/873/1570277137.pdf.

Singh, Ankit, and AL Narasimha Reddy. "Multi Path PERT." Computer Communications and Network (ICCCN), 2013 22nd International Conference, IEEE, 2013. http://citeseerx.ist.psu.edu/viewdoc/download?doi=10.1.1.376.3538&rep=rep1&type=pdf.

Guo, Yihua Ethan, et al. "DEMS: DEcoupled Multipath Scheduler for Accelerating Multipath Transport." Proceedings of the 23rd Annual International Conference on Mobile Computing and Networking, ACM, 2017. http://www.cs.indiana.edu/~fengqian/paper/dems_demo_mobicom17.pdf.

* cited by examiner

TRANSFERRING DATA OVER MULTIPLE NETWORK PATHS USING DECOUPLED SUB-FLOWS

This invention was made with government support under contract number 1629347 awarded by the National Science Foundation. The government has certain rights in the invention The present disclosure relates generally to multipath transport of data to mobile endpoint devices, and more particularly to devices, computer-readable media and methods for transferring data over multiple network paths using decoupled sub-flows.

BACKGROUND

Many mobile devices simultaneously use multiple network paths, such as cellular and wireless fidelity (WiFi) network paths, to accelerate the download of data (e.g., web pages, images, videos, audio files, and the like). Multipath transmission control protocol (MPTCP) is one data delivery scheme that makes use of such multiple network paths. MPTCP allows a TCP connection between a sending device and a receiving device to use multiple network paths to deliver data, by establishing a sub-flow over each of the network paths and then distributing the data onto the sub-flows. A multipath scheduler determines exactly how to distribute the data onto the sub-flows.

SUMMARY

In one example, a request for a chunk of data is received from an application executing on a remote device. The chunk of data is split into a plurality of packets including a first packet and a second packet. A first sub-flow is selected to transport the first packet to the remote device and a second sub-flow is selected to transport the second packet to the remote device. The first sub-flow is decoupled from the second sub-flow. A first stop time is selected for the first sub-flow and a second stop time is selected for the second sub-flow. The first stop time determines when the first sub-flow will complete at the remote device and the second stop time determines when the second sub-flow will complete at the remote device. The first stop time and the second stop time are selected so that the first sub-flow and the second sub-flow will complete simultaneously at the remote device.

In another example, a non-transitory computer-readable medium stores a first set of instructions which, when executed by a processor, cause the processor to perform operations. The operations include receiving a request for a chunk of data from an application executing on a remote device, splitting the chunk of data into a plurality of packets including a first packet and a second packet, selecting a first sub-flow to transport the first packet and a second sub-flow to transport the second packet to the remote device, wherein the first sub-flow is decoupled from the second sub-flow to the remote device, and selecting a first stop time for the first sub-flow and a second stop time for the second sub-flow, wherein the first stop time determines when the first sub-flow will complete at the remote device and the second stop time determines when the second sub-flow will complete at the remote device, and wherein the first stop time and the second stop time are selected so that the first sub-flow and the second sub-flow will complete simultaneously at the remote device.

In another example, a device includes a processor and a computer-readable medium storing a set of instructions which, when executed by the processor, cause the processor to perform operations. The operations include receiving a request for a chunk of data from an application executing on a remote device, splitting the chunk of data into a plurality of packets including a first packet and a second packet, selecting a first sub-flow to transport the first packet and a second sub-flow to transport the second packet to the remote device, wherein the first sub-flow is decoupled from the second sub-flow to the remote device, and selecting a first stop time for the first sub-flow and a second stop time for the second sub-flow, wherein the first stop time determines when the first sub-flow will complete at the remote device and the second stop time determines when the second sub-flow will complete at the remote device, and wherein the first stop time and the second stop time are selected so that the first sub-flow and the second sub-flow will complete simultaneously at the remote device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
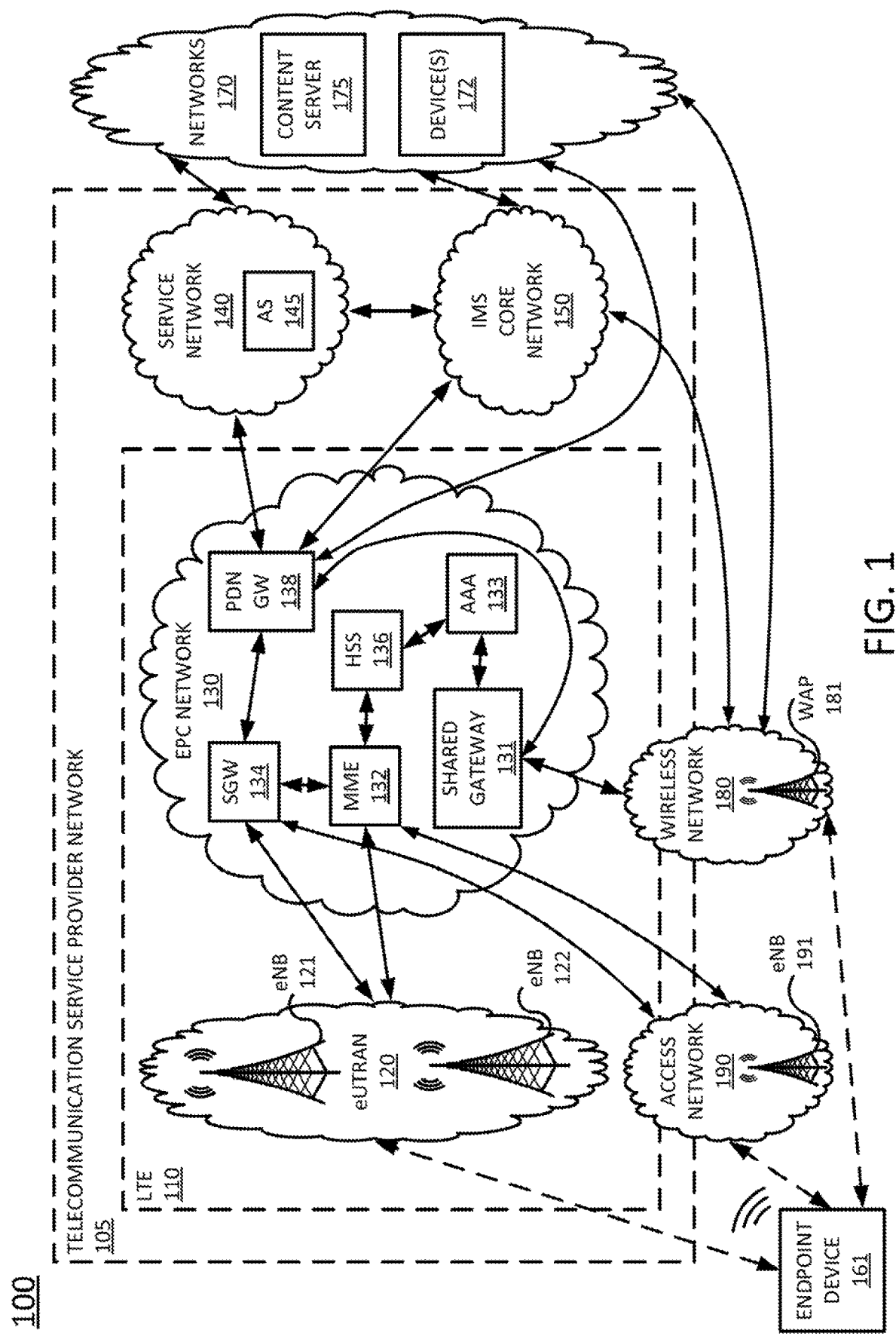
FIG. 1 illustrates an example network, or system that may implement examples of the present disclosure.

The present disclosure broadly discloses devices, computer-readable media, and methods for transferring data over multiple network paths using decoupled sub-flows. As discussed above, multipath transmission control protocol (MPTCP) allows a TCP connection between a sending device and a receiving device to use multiple network paths to deliver data, by establishing a sub-flow over each of the network paths and then distributing the data onto the sub-flows. A multipath scheduler determines exactly how to distribute the data onto the sub-flows.

Many MPTCP schemes use a minimum round trip time (MinRTT) scheduling algorithm as a default. However, experimental results have shown that the MinRTT algorithm may inflate the download time for a medium-sized file (e.g., approximately 256 kilobytes) by as much as thirty-three percent under stable wireless fidelity (WiFi)/cellular network conditions, compared to an optimal scheduling decision derived offline. In real-world conditions where the bandwidth and/or latency of the WiFi/cellular conditions are likely to fluctuate, the gap in performance between the MinRTT algorithm and the optimal scheduling decision may be even greater.

An analysis of the experimental results at the packet-timing level has indicated that the sub-optimal performance of the MinRTT algorithm is likely due to the fact that the packet sub-flows (i.e., the individual flows of packets that are delivered over the multiple paths) do not always complete at the same time at the receiver. For instance, a difference of 100 to 450 milliseconds between the arrival times of the last bytes of two sub-flows has been observed using the MinRTT algorithm, whereas the last bytes are more likely to arrive at the receiver simultaneously using the optimal scheduling decision. Performance of the MPTCP scheme is greatly enhanced when all sub-flows complete at the receiver at the same time.

Examples of the present disclosure make use of decoupled sub-flows to optimize data transfer over multiple network paths in a manner that achieves simultaneous sub-flow completion at a receiver. This results in reduced download time and improved user experience. In some examples, data is delivered to the receiver on a per-chunk basis as a default. Within the context of the present disclosure, a "chunk" of data is understood to refer to a block of bytes defined by the application requesting the data. For example, the chunk may comprise an image, a block of a dynamic scripting language/code (e.g., Javascipt code), an audio file, or a video file. A chunk is a common workload unit for mobile applications such as web browsing and video streaming.

Furthermore, within the context of the present disclosure, a "sub-flow" is understood to comprise a TCP flow for one of multiple available network interfaces (e.g., including cellular interfaces, WiFi interfaces, and the like). Moreover, a "path" is understood to comprise a route through a network associated with the transport of packets in connection with a "sub-flow" associated with a network interface.

Additionally, although examples of the present disclosure are discussed within the example context of transport control protocol (TCP), or MPTCP, the examples of the present disclosure may apply to any type of transport layer protocol that is capable of using multiple paths to transmit data, including multipath quick user datagram protocol (UDP) Internet connections (QUIC) and other protocols. Moreover, although examples of the present disclosure are discussed within the example context of improving download time over cellular and WiFi network paths on mobile endpoint devices, the examples of the present disclosure may apply to any application where multiple paths are available for transmitting data from a sender to a receiver. Thus, examples of the present disclosure may also apply to mobile applications running over a cellular network, to non-mobile applications, to datacenters, and to other types of applications, including applications that may use multiple wired network paths, where a delay difference is present among the multiple network paths.

To aid in understand the present disclosure, FIG. 1 illustrates an example network, or system 100 that may implement examples of the present disclosure. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint device 161 with an application server (AS) 145 in service network 140, with content servers 175 in networks 170, and/or with other components of telecommunication service provider network 105. The endpoint device 161 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the endpoint device 161 may comprise a device of a subscriber or customer of the telecommunication service provider network 105.

Figure 3:
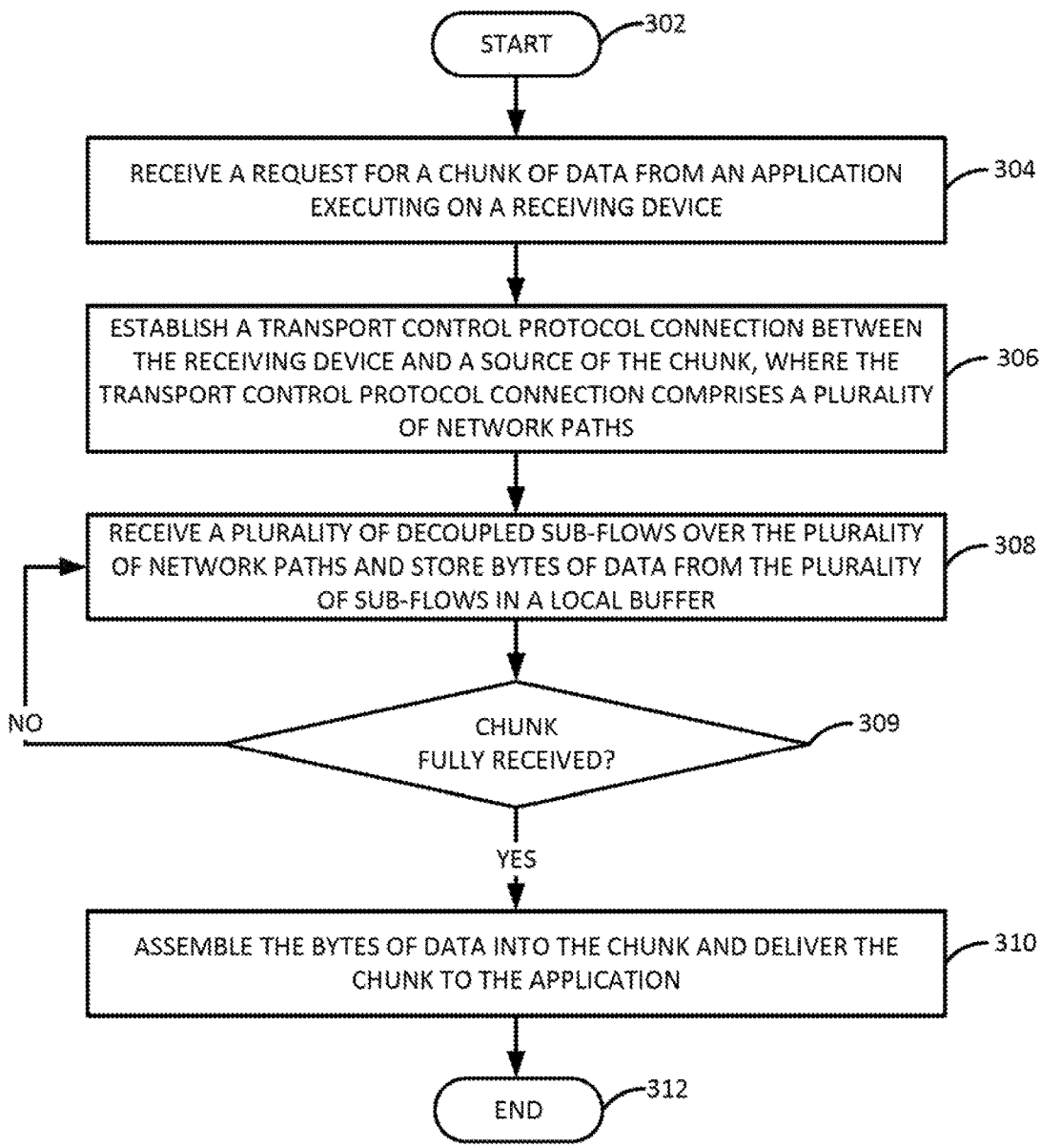
FIG. 3 is a flow diagram illustrating one embodiment of a method for processing a chunk of data, according to the present disclosure.
Figure 4:
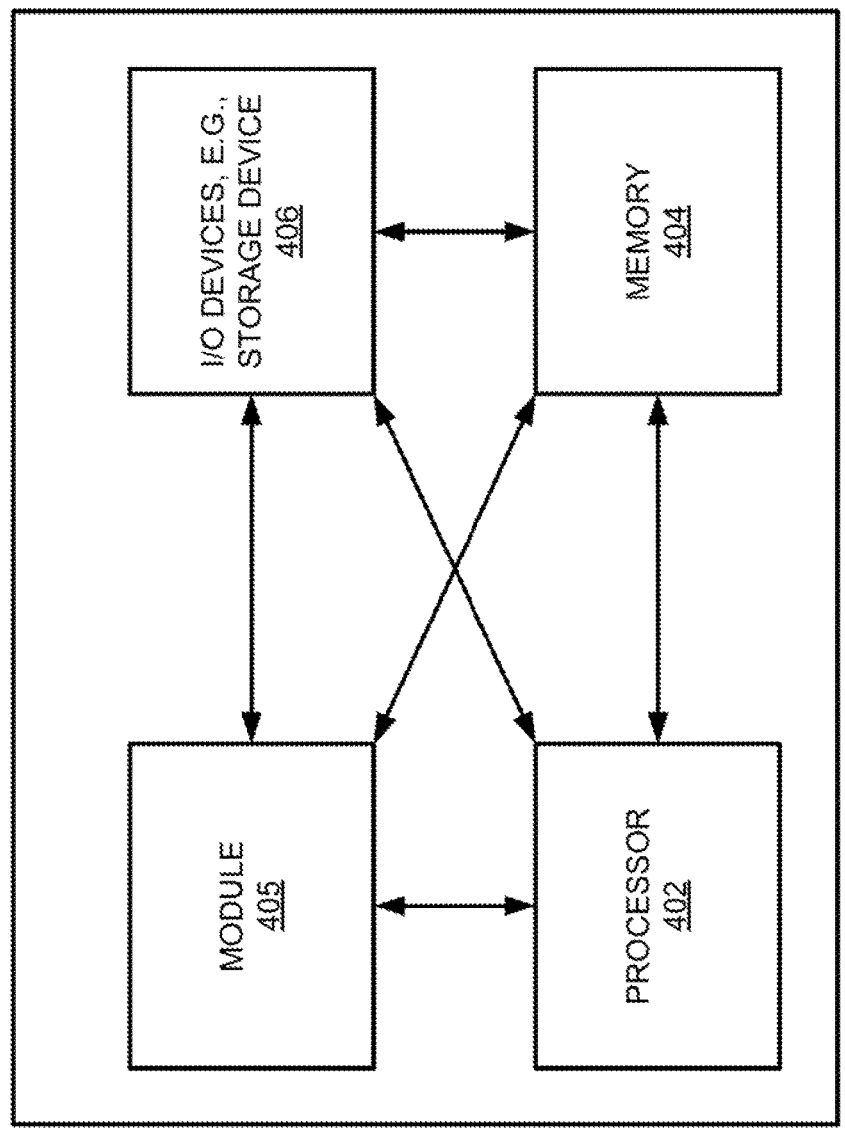
FIG. 4 illustrates an example high-level block diagram of a computer specifically programmed to perform the steps, functions, blocks, and/or operations described herein.

In one example, endpoint device 161 may comprise a computing system, such as computing system 400 depicted in FIG. 4, specifically configured to perform operations relating to transferring data over multiple network paths using decoupled sub-flows, in accordance with the present disclosure. For instance, endpoint device 161 may be configured to perform the operations of the method 300 as illustrated in FIG. 3 and described in greater detail below, and/or to perform other operations.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint device 161, may access wireless services via the eNodeBs 121 and 122 located in eUTRAN 120. It should be noted that any number of eNodeBs can be deployed in a eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint device 161. HSS 136 may also maintain and provide information about subscribers' locations. In one example, Authentication, Authorization, and/or Accounting (AAA) server 133 obtains subscriber profile information form HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW. In one example, system 100 may also include an application server (AS) 135.

In one example, service network 140 may comprise one or more devices, such as application server (AS) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. In one example, AS 145 may comprise a computing system, such as computing system 400 depicted in FIG. 4, specifically configured to perform operations relating to transferring data over multiple network paths using decoupled sub-flows. For instance, AS 145 may be configured to perform all or some of the operations described below in connection with the method 200 and illustrated in FIG. 2. Although a single application server, AS 145, is illustrated in service network 140, it should be understood that service network 140 may include any number of components to support one or more services that may be provided to one or more subscribers, customers, or users by the telecommunication service provider network 105. Thus, in another example AS 145 may represent multiple devices which collectively function as a content server. For instance, a large library of digital content (e.g., web pages, images, videos, audio files, and the like) may be stored on a cluster of devices, where different content may be stored on different physical devices and/or where portions of one or more items of content, e.g., chunks of data may be split across different physical devices.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 172 may include servers, such as web servers, storage devices, enterprise servers, email servers, and so forth. Devices 172 may also include personal computers, desktop computers, laptop computers, personal digital assistants (PDAs), tablet computing devices, or any other devices for wireless and/or wired communications. In one example, endpoint device 161 may communicate with devices 172 in networks 170 via PDN GW 138 and/or via PDN GW 138 and IMS core network 150, e.g., for voice over LTE (VoLTE)-based calls or Wi-Fi calling.

In accordance with the present disclosure, networks 170 may also include one or more content servers 175. In one example, content servers 175 may each comprise a device, such as computing system 400 depicted in FIG. 4, specifically configured to perform operations relating to transferring data over multiple network paths using decoupled sub-flows. For instance, content servers 175 may be configured in the same or a similar manner as described above in connection with AS 145.

In one example, system 100 may also include an access network 190 with an eNodeB (eNB) 391. The eNodeB 191 may comprise, for example, a home eNodeB (HeNB), a "small cell," such as a femtocell, a microcell, etc., and/or a "low power" eNodeB. For instance, eNB 191 may have a range of two kilometers or less, while eNodeBs 121 and 122 may have a range of up to thirty-five kilometers or more. In one example, access network 190 and eNB 191 may connect to EPC network 130 via a subscriber/customer broadband connection. For instance, access network 190 may comprise a home network of a customer/subscriber and eNodeB 191 may connect via a home gateway (not shown) or similar equipment deployed at the customer premises to SGW 134 and MME 132 in EPC network 130, e.g., via S1 interfaces. While access network 190 may comprise a home network, eNodeB 191 may continue to be managed by telecommunication service provider network 105 or may be managed by a customer/subscriber associated with access network 190.

In another example, both access network 190 and eNodeB 191 may be controlled and/or managed by telecommunication service provider network 105. In other words, access network 190 and eNodeB 191 may be part of telecommunication service provider network 105 and/or LTE network 110. For instance, an operator of telecommunication service provider network 105 may add access network 190 and eNodeB 115 as a small cell, picocell, femtocell, or the like to fill gaps in coverage of macro-cells or to temporarily support larger numbers of endpoint devices in an area, e.g., at a concert, sporting event, or other large gathering. In still another example, access network 190 may comprise a portion of a peer network, e.g., of a different telecommunication service provider.

In one example, EPC network 130 may also include a shared gateway 131. In one example, shared gateway 131 may comprise an evolved packet data gateway (ePDG), a trusted wireless local area network (WLAN) authentication, authorization, and accounting (AAA) proxy (TWAP), and a trusted WLAN access gateway (TWAG). In other words, shared gateway 131 may comprise a device that is configured to provide functions of all of an ePGD, a TWAP and a TWAG. In one example, ePDG functionality of the shared gateway 131 may process traffic from endpoint devices accessing the EPC network 130 via untrusted wireless networks (e.g., IEEE 802.11/Wi-Fi networks), while TWAP/TWAG functionality of shared gateway 141 may process traffic from endpoint devices accessing the EPC network via trusted wireless networks (e.g., IEEE 802.11/Wi-Fi networks). Wireless networks and WAPs may be designated as "trusted" or "untrusted" based upon several factors, such as whether the wireless network is a customer or subscriber network, or a peer network, e.g., of a different telecommunication service provider, based upon a model or type of WAP, and so forth. In addition, as referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 100.

In accordance with the present disclosure, a number of network interfaces may be available to endpoint device 161 to communicate with AS 145 and/or content servers 175, e.g., to obtain digital data. For instance, a first network interface may be available via eUTRAN 120 and eNodeBs 121 and 122, e.g., a "cellular interface." A second network interface may be available via wireless network 180 and WAP 181, e.g., a "Wi-Fi interface." In addition, a third network interface may be available via access network 190 and eNodeB 191, e.g., a second "cellular interface."

Although not illustrated in FIG. 1, other network interfaces may be available, such as additional Wi-Fi interfaces, a wired interface, e.g., via a wired Ethernet local area network (LAN), a satellite downlink (and/or a satellite link with both uplink and downlink support), and so forth. As such, in one example, endpoint device 161 may provide a user interface to enable a user of endpoint device 161 to select a preferred network interface as a primary interface for an MPTCP connection. In one example, the user interface may further enable the user of endpoint device 161 to select one or more additional interfaces as secondary interfaces (and alternatively, to designate certain interfaces as being unavailable for an MPTCP connection). In one example, the endpoint device 161 may open one or more transmission control protocol (TCP) sessions (or other transport layer sessions, such as uniform datagram protocol (UDP) sessions) for each of the available network interfaces.

In this regard, it should be noted that as referred to herein, when a network interface is enabled or disabled, this may similarly refer to enabling or disabling a "sub-flow" (e.g., a TCP flow for one of the network interfaces). As noted above, the term "path" may also be used to describe a route through a network associated with the transport of packets in connection with a "sub-flow" associated with a network interface. Endpoint device 161 may therefore utilize any one or more of the network interfaces to request digital data, e.g., from AS 145 and/or one or more of content servers 175.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, shared gateway 131 and SGW 134 may be combined into a single component, AAA 133 and HSS 136 may be combined into a single component, and so forth. In addition, various elements of eUTRAN 120, EPC network 130, and IMS core network 150 may be omitted for clarity, including gateways or border elements providing connectivity between such networks, and between the network elements therein.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). Similarly, although the shared gateway 131, HSS 136, and AAA server 133 are illustrated as components within EPC network 130 having a particular configuration, in other examples, any one or more of these components may be deployed in a different configuration. For example, HSS 136 and/or AAA server 133 may be deployed in IMS core network 150, while other components may reside external to EPC network 130 within LTE network 110, and so on. Thus, these and other modifications are all contemplated within the scope of the present disclosure.

Figure 2:
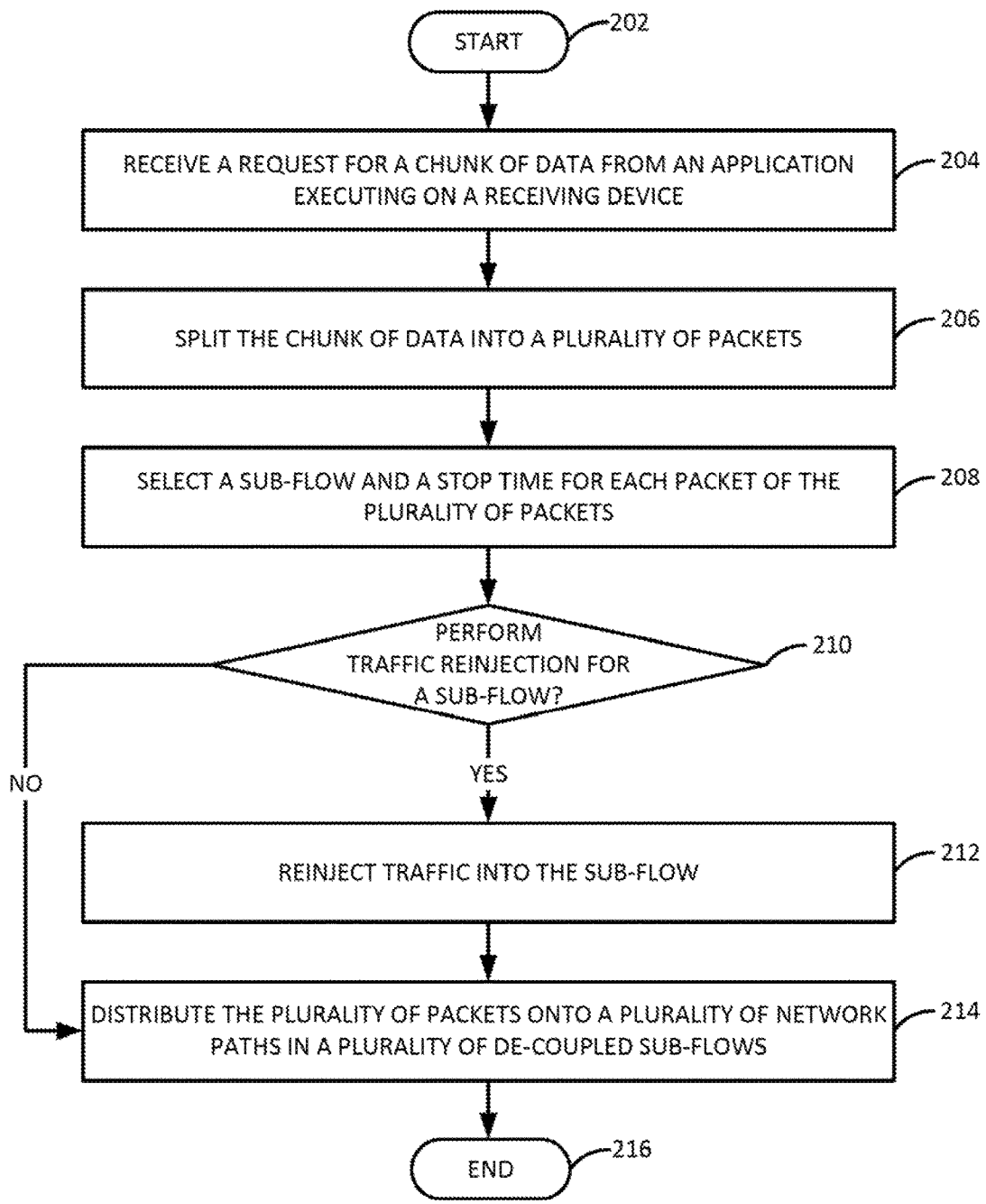
FIG. 2 is a flow diagram illustrating one embodiment of a method for sending a chunk of data, according to the present disclosure.

FIG. 2 is a flow diagram illustrating one embodiment of a method 200 for sending a chunk of data, according to the present disclosure. The method 200 may be performed, for example, by the AS 145 or the content server 175 of FIG. 1. As such, reference may be made in the discussion of the method 200 to various elements of FIG. 1. However, it should be appreciated that the method 200 is not limited to implementation in a network configured exactly as illustrated in FIG. 1.

The method 200 begins in step 202. In step 204, a request for a chunk of data is received from an application executing on a receiving device (e.g., a user endpoint device, such as endpoint device 161 or one of the devices 172 of FIG. 1). As discussed above, the chunk of data may comprise a block of bytes defined by the application. For example, the chunk may comprise an image, a block of a dynamic scripting language/code (e.g., Javascipt code), an audio snippet, or a video file.

In step 206, the chunk of data is split into a plurality of packets. The device performing the method 200 in this case has knowledge of the chunk boundaries. Since the manner in which the data within the chunk is delivered does not matter (as long as the data is reassembled correctly at the receiver side), the chunk can be split efficiently into a plurality of packets for transfer over multiple sub-flows. In one example, the plurality of packets includes at least a first packet and a second packet.

In step 208, a sub-flow and a stop time (at the receiving device) is selected for each packet of the plurality of packets, so that simultaneous completion of all sub-flows containing the plurality of packets is achieved at the receiving device. A plurality of available network paths for transmitting the sub-flows from the sending device (e.g., the AS 145 or content server 175) to the receiving device may include both cellular network paths and WiFi network paths. In one example, the plurality of available network paths includes at least a first network path and a second network path. The stop time comprises the time at which transmission of a corresponding sub-flow will be stopped at the receiving device.

As discussed above, the sub-flows and stop times are selected to achieve simultaneous completion of the sub-flows at the receiving device. For instance, when a first network path and a second network path experience different delays, the sub-flow being carried over the network path experiencing the longer network delay may be stopped earlier at the receiving device. In this way, the difference between the finish times of the sub-flows can compensate for the difference in network delay between the first network path and the second network path.

In one example, the sub-flows and stop times are selected based on the estimated network conditions on the available network paths. For instance, a first sub-flow and a second sub-flow may be available to transmit a packet over the network, where the first sub-flow has a first one-way delay and the second sub-flow has a second one-way delay that is smaller than the first one-way delay. When the first sub-flow with the larger one-way delay can transmit the packet over the network, the arrival time of this packet over the first sub-flow and the second sub-flow may be predicted. The sub-flow with the earlier packet arrival time may then be selected. Then, based on this selection, the first sub-flow (with the larger one-way delay) may stop transmission earlier than the second sub-flow (with the smaller one-way delay).

In other words, by employing a calculated timing offset (calculated based on network latency and bandwidth) between two sub-flows with different RTTs at the sender side, the method 200 can ensure that the last packets across both sub-flows will arrive at the receiver at the same time. For instance, assuming that $OWD_1$ and $OWD_2$ represent the one-way delays of a sub-flow 1 and a sub-flow 2, respectively, it may be determined that $OWD_2 > OWD_1$. $t_{s1}$ and $t_{s2}$ may represent the respective times when the last bytes are transmitted over sub-flow 1 and sub-flow 2, while $t_{r1}$ and $t_{r2}$ may represent the respective times at which the last bytes are received by sub-flow 1 and sub-flow 2 (i.e., the respective times at which sub-flow 1 and sub-flow 2 complete at a receiver). If no packet re-ordering or loss occurs, then:

$$t_{r1} - t_{s1} = OWD_1 + t_{offset} \tag{EQN. 1}$$

and $$t_{r2} - t_{s2} = OWD_2 + t_{offset} \tag{EQN. 2}$$

where $t_{offset}$ is the clock difference between the sender and the receiver. Thus, the sub-flow completion time difference (i.e., $t_{r2} - t_{r1}$) may be calculated as:

$$t_{r2} - t_{r1} = (t_{s2} - t_{s1}) + (OWD_2 - OWD_1) \tag{EQN. 3}$$

Thus, the receiver-side sub-flow completion time difference depends on both the sender-side transmission completion time difference (i.e., $\Delta t_s = t_{s2} - t_{s1}$) and on the forward-path one-way delay difference (i.e., $\Delta OWD = OWD_2 - OWD_1$). Thus, to ensure simultaneous sub-flow completion, $$t_{s1} - t_{s2} = OWD_2 - OWD_1 = \Delta OWD \tag{EQN. 4}$$

That is, at the sender side, the sub-flow with the larger one-way delay finishes transmission $\Delta OWD$ earlier than the sub-flow with the smaller one-way delay.

In step 210, it is determined whether traffic reinjection should be performed for any of the sub-flows selected in step 208. In one example, reinjection is performed to improve performance when network conditions may be unstable or unpredictable over one or more of the network paths that will carry the sub-flows. Reinjection in this case involves sending redundant bytes of data over a sub-flow. For instance, a first sub-flow may be assigned packets 1 and 2 of a chunk, while a second sub-flow may be assigned packets 3 and 4 of the same chunk (the chunk may include more than four packets in total). The first sub-flow may finish delivering packets 1 and 2 (in that order) before the second-sub-flow finishes delivering packets 4 and 3 (in that order). In this case, the second sub-flow may be experiencing a greater delay than the first sub-flow. Instead of the first sub-flow stopping at the receiver when all of its bytes (i.e., packets 1 and 2) are delivered, however, the first sub-flow may "help" the second sub-flow by continuing to transmit a small number of bytes (i.e., redundant data) that was assigned to the second sub-flow. For instance, packet 3 may be reinjected into the first sub-flow as redundant data. Thus, if the redundant data transmitted by the first sub-flow arrives at the receiver earlier than the "original" data transmitted by the second sub-flow, the overall time to download the data carried by the first and second sub-flows at the receiver will be reduced, even if the redundant data is transmitted twice (as the receiver will not have to wait for the original data to arrive in the second sub-flow before reassembling the chunk). Reinjection therefore trades data redundancy for better performance.

In one example, the amount of redundant data that is reinjected into the first sub-flow may be calculated to balance the performance improvement against the costs of the additional data volume. Reinjecting too little data will result in longer download time, but reinjecting too much data may cause unnecessary battery drain and/or data plan usage (for cellular networks). In one example, reinjection is performed only near two sub-flows' meeting point. A reasonable upper bound on the total number of bytes to be reinjected can be computed in one example as:

$$\frac{BW_1 BW_2}{BW_1 + BW_2}(RTT_1 + RTT_2) \tag{EQN. 5}$$

Where $BW_1$ is the bandwidth of the first sub-flow, $BW_2$ is the bandwidth of the second sub-flow, $RTT_1$ is the round trip time of the first sub-flow, and $RTT_2$ is the round trip time of the second sub-flow.

In other examples, the total number of bytes to be reinjected can be computed adaptively, where the amount of data that is reinjected varies proportionally to the rate of fluctuation of the network conditions (e.g., when the rate of fluctuation is low, less data is reinjected; when the rate of fluctuation is high, more data is reinjected). For instance, assuming $\Delta OWD$ underestimated, the actual value of the difference in one-way delays between sub-flow 1 and sub-flow 2 may be denoted as $\Delta OWD_{real} = \Delta OWD + \delta$. $OWD_1$ and $OWD_2$ in this case represent the estimated one-way delays for sub-flow 1 and sub-flow 2, and $OWD_{1,real}$ and $OWD_{2,real}$ denote the actual values of the one-way delays for sub-flow 1 and sub-flow 2, respectively. Since what matters is the prediction accuracy of the difference between the one-way delays (more so than the one-way delays themselves), it may be assumed that $OWD_{1,real} = OWD_1$ and $OWD_{2,real} = OWD_2 + \delta$.

Under these assumptions, if $\Delta OWD$ is underestimated, sub-flow 1 may complete $\delta$ units of time before sub-flow 2 at the receiver side. In other words, $\Delta OWD$ is underestimated by $\delta$. In this case, the sub-flow with the smaller one-way delay may reinject data until a to-be-reinjected byte of data was transmitted more than $\Delta OWD + \delta$ units of time ago. Mathematically, this may be expressed as:

$$\Delta t_{si} = t_{s1i} - t_{s2i} > OWD_{2i} - OWD_{1i} + \delta \tag{EQN. 6}$$

Where $t_{s1i}$ is the current sender-side timestamp for sub-flow 1, $t_{s2i}$ is the current sender-side timestamp for sub-flow 2, $\Delta t_{si}$ is the difference between the current sender-side timestamps for sub-flow 1 and sub-flow 2, $OWD_{1i}$ is a current estimate of $OWD_1$, and $OWD_{2i}$ is a current estimate of $OWD_2$. If the number of reinjected bytes is denoted by r, the $r/BW_1 + r/BW_2 = \delta$, which leads to $r = \delta BW_1 BW_2/(BW_1 + BW_2)$.

Conversely, if $\Delta OWD$ is overestimated, the sub-flow with the larger one-way delay may reinject data until the to-be-reinjected byte of data was transmitted more than $\Delta OWD + \delta$ units of time ago. Mathematically, this may be expressed as:

$$\Delta t_{si} = t_{s1i} - t_{s2i} < OWD_{2i} - OWD_{1i} + \delta \tag{EQN. 7}$$

The reinjection overhead may also be denoted as $r = \delta BW_1 BW_2/(BW_1 + BW_2)$. In one example, it may only be possible to estimate (with a desired level of confidence) that $\Delta OWD_{real}$ falls within the range of $[\Delta OWD - \delta, \Delta OWD + \delta]$. Thus, both sub-flow 1 and sub-flow 2 may perform reinjection according to EQNs. 6 and 7. The overall reinjection overhead may then be calculated as:

$$2\delta \frac{BW_1 BW_2}{BW_1 + BW_2} \quad \text{(EQN. 8)}$$

The redundant bytes may also help to tolerate inaccurate bandwidth predictions for the sub-flow with the smaller one-way delay, as well as help recover from packet losses (within the range of the reinjected bytes) quickly.

Referring back to FIG. 2, if it is determined in step 210 that traffic reinjection should be performed, then the method 200 proceeds to step 212, where traffic is reinjected into at least one sub-flow. The method 200 then proceeds to step 214. If, however, it is determined in step 210 that traffic reinjection should not be performed, then the method 200 proceeds directly to step 214.

In step 214, the plurality of packets is distributed onto at least some of the plurality of available network paths in a plurality of de-coupled sub-flows. In one example, where the plurality of packets is distributed onto two network paths of the plurality of available network paths (e.g., the first network path and the second network path), a two-way splitting approach is implemented. In this case, the first network path and the second network path transport their respective sub-flows in opposite directions. For instance, the first network path may transport a first sub-flow starting from the beginning of the chunk and going forward (e.g., bytes 1 through i of an example n-byte chunk), while the second network path may transport a second sub-flow starting from the end of the chunk and going backward (e.g., bytes n through i+1 of the example n-byte chunk). When the first sub-flow "meets" the second sub-flow (e.g., the sub-flows reach the same or adjacent bytes), the data chunk is fully downloaded by the receiving device. Thus, unlike conventional MPTCP approaches which tightly couple sub-flows, this approach de-couples the first sub-flow and the second sub-flow. As such, the first sub-flow and the second sub-flow may freely and independently transport their respective packets until they meet and merge; a stall (e.g., due to packet loss) in the first sub-flow will not slow down the second sub-flow, or vice versa. This example applies to the case in which two sub-flows are used to transmit the plurality of packets; in other examples, however, more than two sub-flows may be used to transmit the plurality of packets.

The method 200 ends in step 216.

In some examples, the traffic reinjection technique performed in step 212 could be performed independently of steps 206-208 and 214. For instance, any multipath data transfer scheme, whether it employs the use of decoupled sub-flows or tightly coupled sub-flows, or whether it treats data as chunks or as continuous streams, could employ traffic re-injection to accelerate downloads when the various network paths experience different network conditions.

FIG. 3 is a flow diagram illustrating one embodiment of a method 300 for processing a chunk of data, according to the present disclosure. The method 300 may be performed, for example, by a user endpoint device such as the endpoint device 161 or one of the devices 172 of FIG. 1. As such, reference may be made in the discussion of the method 300 to various elements of FIG. 1. However, it should be appreciated that the method 300 is not limited to implementation in a network configured exactly as illustrated in FIG. 1.

The method 300 begins in step 302. In step 304, a request is received from an application executing on a receiving device, e.g., a user endpoint device (e.g., endpoint device 161 or one of the devices 172 of FIG. 1). The request requests a chunk (i.e., a block of bytes) of data from a remote network source (e.g., from AS 145 or content servers 175 of FIG. 1). In one example, the chunk is defined by the application and may comprise, for instance, an image, a block of a dynamic scripting language/code (e.g., Javascipt code), an audio file, or a video file.

In step 306, a connection is established between the receiving device and the source of the chunk. In one example, the connection is a TCP connection that is established through a series of messages known as a three-way handshake. The TCP connection may be capable of establishing a plurality of network paths between the receiving device and the source of the chunk, where the plurality of network paths may include both WiFi network paths and cellular network paths. The plurality of network paths may include at least a first network path and a second network path.

In step 308, a plurality of decoupled sub-flows is received over the plurality of network paths and stored locally in a buffer (e.g., as bytes of data). The plurality of sub-flows may include at least a first sub-flow and a second sub-flow. Each sub-flow of the plurality of sub-flows includes a plurality of bytes, where the plurality of bytes comprises at least a portion of the chunk requested in step 304.

In step 309, it is determined whether the chunk has been fully received. The user endpoint device will know the expected size of the chunk, since the chunk was defined by the application. Thus, the user endpoint device will be able to detect when all bytes of the chunk have been received. Alternatively, the source of the chunk may inform the user endpoint device of the size of the chunk before it begins to push the sub-flows to the user endpoint device.

If it is determined in step 309 that the chunk has not been fully received, then the method returns to step 308. The plurality of sub-flows continues to be received and stored locally in the buffer until the chunk is fully received. Once it is determined in step 309 that the chunk has been fully received, the method 300 proceeds to step 310.

In step 310, the bytes that are stored locally in the buffer are reassembled to form the chunk, and the chunk is delivered to the application that requested it in step 304.

The method 300 then ends in step 312.

In addition, it should be noted that although not specifically specified, one or more steps, functions or operations of the methods 200 and 300 may include a storing, displaying and/or outputting step as required for a particular application. In other words, any data, records, fields, and/or intermediate results discussed in the methods 200 and 300 can be stored, displayed and/or outputted to another device as required for a particular application. Furthermore, steps or blocks in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 and 300 may comprise optional steps, or can be combined, separated, and/or performed in a different order from that described above, without departing from the example embodiments of the present disclosure. The methods 200 and 300 may also be expanded to include additional steps. Thus, these and other modifications are all contemplated within the scope of the present disclosure.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for transferring data over multiple network paths using decoupled sub-flows, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the methods 200 or 300 as discussed above is implemented in a distributed or parallel manner for a particular illustrative example, i.e., the steps of the above methods 200 or 300, or the entire method 200 or 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 200 and 300. In one embodiment, instructions and data for the present module or process 405 for transferring data over multiple network paths using decoupled sub-flows (e.g., a software program comprising computer-executable instructions) can be loaded into memory 404 and executed by hardware processor element 402 to implement the steps, functions or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for transferring data over multiple network paths using decoupled sub-flows (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a processing system including at least one processor, a request for a chunk of data from an application executing on a remote device;
   splitting, by the processing system, the chunk of data into a plurality of packets including a first packet and a second packet;
   selecting, by the processing system, a first sub-flow to transport the first packet and a second sub-flow to transport the second packet to the remote device, wherein the first sub-flow is decoupled from the second sub-flow to the remote device;
   selecting, by the processing system, a first stop time for the first sub-flow and a second stop time for the second sub-flow, wherein the first stop time determines when the first sub-flow will complete at the remote device and the second stop time determines when the second sub-flow will complete at the remote device, and wherein the first stop time and the second stop time are selected so that the first sub-flow and the second sub-flow are calculated to complete simultaneously at the remote device;
   transmitting, by the processing system, the first sub-flow over a first network path of a transport layer protocol connection to the remote device; and
   transmitting, by the processing system, the second sub-flow over a second network path of the transport layer protocol connection, wherein the transmitting the first sub-flow over the first network path transmits the first sub-flow from a first byte of the chunk of data going forward, and wherein the transmitting the second sub-flow over the second network path transmits the second sub-flow from a last byte of the chunk of data going backward.

2. The method of claim 1, wherein the first network path is a wireless fidelity network path, and wherein the second network path is a cellular network path.

3. The method of claim 1, wherein the first sub-flow has a first one-way delay and the second sub-flow has a second one-way delay that is larger than the first one-way delay, and wherein the transmitting the first sub-flow stops earlier than the transmitting the second sub-flow.

4. The method of claim 3, wherein a timing offset between stopping the transmitting the first sub-flow and stopping the transmitting the second sub-flow is calculated based on a latency and a bandwidth of a network supporting the transport layer protocol connection.

5. The method of claim 1, further comprising:
   determining that all bytes of the first sub-flow have been delivered to the remote device, but that all bytes of the second sub-flow have not been delivered to the remote device; and
   reinjecting a number of bytes of the second sub-flow in the first sub-flow, subsequent to all bytes of the first sub-flow being delivered to the remote device.

6. The method of claim 5, wherein the number of bytes is computed based on a bandwidth of the first sub-flow, a bandwidth of the second sub-flow, a round trip time of the first sub-flow, and a round trip time of the second sub-flow.

7. The method of claim 5, wherein the number of bytes is computed based on a rate of fluctuation of a condition of a network including the first network path and the second network path.

8. The method of claim 7, wherein the number of bytes varies proportionally to the rate of fluctuation of the condition of the network.

9. The method of claim 1, wherein the chunk of data is fully downloaded to the remote device when the first sub-flow meets the second sub-flow.

10. The method of claim 1, wherein the first sub-flow and the second sub-flow are two of a plurality of sub-flows totaling more than two sub-flows.

11. A non-transitory computer-readable medium storing a first set of instructions which, when executed by a processor, cause the processor to perform operations, the operations comprising:
receiving a request for a chunk of data from an application executing on a remote device;
splitting the chunk of data into a plurality of packets including a first packet and a second packet;
selecting a first sub-flow to transport the first packet and a second sub-flow to transport the second packet to the remote device, wherein the first sub-flow is decoupled from the second sub-flow to the remote device;
selecting a first stop time for the first sub-flow and a second stop time for the second sub-flow, wherein the first stop time determines when the first sub-flow will complete at the remote device and the second stop time determines when the second sub-flow will complete at the remote device, and wherein the first stop time and the second stop time are selected so that the first sub-flow and the second sub-flow are calculated to complete simultaneously at the remote device;
transmitting the first sub-flow over a first network path of a transport layer protocol connection to the remote device; and
transmitting the second sub-flow over a second network path of the transport layer protocol connection, wherein the transmitting the first sub-flow over the first network path transmits the first sub-flow from a first byte of the chunk of data going forward, and wherein the transmitting the second sub-flow over the second network path transmits the second sub-flow from a last byte of the chunk of data going backward.

12. The non-transitory computer-readable medium of claim 11, wherein the first sub-flow has a first one-way delay and the second sub-flow has a second one-way delay that is larger than the first one-way delay, and wherein the transmitting the first sub-flow stops earlier than the transmitting the second sub-flow.

13. The non-transitory computer-readable medium of claim 12, wherein a timing offset between stopping the transmitting the first sub-flow and stopping the transmitting the second sub-flow is calculated based on a latency and a bandwidth of a network supporting the transport layer protocol connection.

14. The non-transitory computer-readable medium of claim 11, the operations further comprising:
determining that all bytes of the first packet have been delivered to the remote device, but that all bytes of the second packet have not been delivered to the remote device; and
reinjecting a number of bytes of the second packet in the first sub-flow, subsequent to all bytes of the first packet being delivered to the remote device.

15. The non-transitory computer-readable medium of claim 14, wherein the number of bytes is computed based on a bandwidth of the first sub-flow, a bandwidth of the second sub-flow, a round trip time of the first sub-flow, and a round trip time of the second sub-flow.

16. The non-transitory computer-readable medium of claim 14, wherein the number of bytes is computed based on a rate of fluctuation of a condition of a network including the first network path and the second network path.

17. The non-transitory computer-readable medium of claim 16, wherein the number of bytes varies proportionally to the rate of fluctuation of the condition of the network.

18. The non-transitory computer-readable medium of claim 11, wherein the chunk of data is fully downloaded to the remote device when the first sub-flow meets the second sub-flow.

19. The non-transitory computer-readable medium of claim 11, wherein the first sub-flow and the second sub-flow are two of a plurality of sub-flows totaling more than two sub-flows.

20. A device comprising:
a processor; and
a computer-readable medium storing a set of instructions which, when executed by the processor, cause the processor to perform operations, the operations comprising:
receiving a request for a chunk of data from an application executing on a remote device;
splitting the chunk of data into a plurality of packets including a first packet and a second packet;
selecting a first sub-flow to transport the first packet and a second sub-flow to transport the second packet to the remote device, wherein the first sub-flow is decoupled from the second sub-flow to the remote device;
selecting a first stop time for the first sub-flow and a second stop time for the second sub-flow, wherein the first stop time determines when the first sub-flow will complete at the remote device and the second stop time determines when the second sub-flow will complete at the remote device, and wherein the first stop time and the second stop time are selected so that the first sub-flow and the second sub-flow are calculated to complete simultaneously at the remote device;
transmitting the first sub-flow over a first network path of a transport layer protocol connection to the remote device; and
transmitting the second sub-flow over a second network path of the transport layer protocol connection, wherein the transmitting the first sub-flow over the first network path transmits the first sub-flow from a first byte of the chunk of data going forward, and wherein the transmitting the second sub-flow over the second network path transmits the second sub-flow from a last byte of the chunk of data going backward, wherein the chunk of data is fully downloaded to the remote device when the first sub-flow meets the second sub-flow.

* * * * *